United States Statutory Invention Registration [19]

[11] Reg. Number: H407

George [43] Published: Jan. 5, 1988

[54] ELECTRICITY AND SHORT WAVELENGTH RADIATION GENERATOR

[75] Inventor: E. Victor George, Livermore, Calif.

[73] Assignee: The United States of America as represented by the United States Department of Energy, Washington, D.C.

[21] Appl. No.: 769,518

[22] Filed: Aug. 26, 1985

[51] Int. Cl.[4] ..... G21D 7/00

[52] U.S. Cl. ..... 376/147; 376/320; 376/326

[58] Field of Search ..... 376/144, 147, 151, 202, 376/320, 326, 150, 154; 310/301, 302, 304; 136/202

[56] References Cited

U.S. PATENT DOCUMENTS

| | | | |
|---|---|---|---|
| 2,440,167 | 4/1948 | Broxon et al. | 376/155 |
| 2,493,935 | 1/1950 | Wiegand et al. | 376/154 |
| 2,595,622 | 5/1952 | Wiegand | 376/154 |
| 3,093,567 | 6/1963 | Jablonski et al. | 376/320 |
| 3,219,849 | 11/1965 | Webb | 376/320 |
| 3,483,040 | 12/1969 | Parkins | 310/301 |
| 4,178,524 | 12/1979 | Ritter | 310/304 |
| 4,344,911 | 8/1982 | Maniscalco et al. | 376/150 |

*Primary Examiner*—Deborah L. Kyle
*Assistant Examiner*—Richard L. Klein
*Attorney, Agent, or Firm*—John F. Schipper; Clifton E. Clouse, Jr.; Judson R. Hightower

[57] ABSTRACT

Methods and associated apparati for use of collisions of high energy atoms and ions of He, Ne or Ar with themselves or with high energy neutrons to produce short wavelength radiation ($\lambda \approx 840$–$1300$ Å) that may be utilized to produce cathode-anode currents or photovoltaic currents.

7 Claims, 6 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTRICITY AND SHORT WAVELENGTH RADIATION GENERATOR

FIELD OF THE INVENTION

This invention relates to use of neutron reactions with low atomic weight elements to produce electrical voltages and/or short wavelength electromagnetic radiation.

BACKGROUND OF THE INVENTION

Broxon and Jesse, in U.S. Pat. No. 2,440,167, discloses a differential ion chamber for separately measuring the flux of slow neutrons and of fast neutron and gamma rays. The apparatus uses three concentric, hollow cylindrical electrodes $C_1$, $C_2$ and $C_3$, defining therebetween an inner subchamber $C_1$–$C_2$ and an outer subchamber $C_2$–$C_3$, each of volume approximately 800 $cm^3$. $C_2$ serves as a charged particle collector (first anode), and the inner surface of $C_3$ and the outer surface of $C_2$ are each coated with B or Li to emit $\alpha$ particles when bombarded with slow neutrons. A positive static voltage $V(C_1-C_3)=360$–$1195$ volts is applied across the electrodes $C_1$ and $C_3$, and the electrode $C_2$ is electrically connected to the apparatus casing, with $V(C_1-C_2)\approx 360$ volts. Each subchamber is filled with an inert gas such as He or Ar at equal pressures $p\approx 1$ atmosphere. A fast neutron or gamma particle moving in the subchamber gas may produce additional charged particles such as $He^{+1,2}$, $e^-$ and negative ions. In subchamber $C_1$–$C_2$ ($C_2$–$C_3$), the electrons and negative ions thus produced move toward $C_1$ ($C_2$) due to the imposed potential differences and the positive ions move in the opposite direction. The net electric charge collected at $C_2$ due to fast neutron or gamma ray reactions in the two subchambers is zero. But the slow neutrons incident on the coated walls of the subchamber $C_2$–$C_3$ will produce excess negative charge at $C_2$ and allow slow neutron flux to be measured separately from fast radiation particle flux. Net current thus flows from $C_2$ to $C_3$. The apparatus uses three electrodes and externally imposed electric potentials between the electrodes to promote charged particle flow. The only nuclear reaction relied upon is apparently $n+Li\rightarrow He^{++}$ (other charged particles), and no excimer reactions are utilized.

A high energy neutron detector is disclosed by Wiegand and Segre in U.S. Pat. No. 2,493,935. A sequence of thin, planar, parallel circular discs of A1, electrically insulated and spaced apart from one another with each disc being coated with a thin Bi layer (surface density $\approx 1$ mgm/$cm^2$), is positioned in a closed, hollow chamber containing Ar gas of pressure $p\gtrsim 1$ atmosphere plus three percent $CO_2$ gas. Discs number 1, 3, 5, 7, . . . are then connected electrically together, and discs number 2, 4, 6, 8, . . . are connected electrically together; but these two subsets of discs are electrically insulated from one another. An electric voltage $V=400$–$800$ volts is externally impressed upon one subset of these discs relative to the other subset. The chamber is apparently provided with a "window" for neutrons to enter in a direction roughly perpendicular to the disc planes. Collisions of fast neutrons of energy $E>40$ MeV with the Bi atoms in the disc coatings caused Bi to fission, and the high kinetic energy fission fragments cause multiple ionization of the Ar gas particles. The positively charged Ar ions move to the discs of high electric potential, and the negatively charged electrons move to the alternate discs of low electric potential, thus creating an electric current between alternate plates that can be measured and related to the flux of fast neutrons incident upon the apparatus. The Bi coating may be replaced by a coating of Au or Th or other suitable element with different fusion energy thresholds. The wiegand and Segre invention uses coatings of fissionable material, the bulk disc material itself is chosen to possess low capture or reaction cross-section for fast neutrons, and an electric potential is externally imposed on the target discs.

Wiegand discloses a fission indicator in U.S. Pat. No. 2,595,622, using three thin, plane parallel electrodes with the middle electrode being grounded and the two outer electrodes having equal magnitude, opposite sign, externally imposed electrical potential. The three electrodes are positioned in a closed hollow container filled with a noble gas at pressure $p\gtrsim 1$ atmosphere. The electrode material is a low atomic weight metal, if low energy particles are to be monitored, and is a medium or higher atomic weight metal if high energy particles are to be monitored. The fission fragment particle beam enters the container interior through a thin window in one container wall and causes ionization of the gas between each pair of adjacent electrodes, and the negatively charged particles move toward the higher potential electrode so that a current is established between any two adjacent electrodes. This causes a current to flow in an external circuit connecting the two outer electrodes. The object of the apparatus is to measure only the ionization produced by the fission fragments and to remove or cancel out the effects of ionization from charged particles within the container. The electrode plates are not coated or otherwise treated with a suitable fission material such as $Li^6$ and no excimer reactions are utilized. The inter-electrode potentials are externally imposed.

U.S. Pat. No. 3,093,567 issued to Jablonski and Laffert, discloses a fission reaction device for generating electric power, by analogy with a thermo-electric cell. A small mass of fissionable material forms the cathode and a metallic or other conducting surface (maintained at a cooler temperature) forms the anode, with the space between cathode and anode being filled with Ar gas at a pressure $p\approx 20$ Torr. Fission fragments from the cathode material cause ionization of the Ar gas (desired ion density: $10^{11}$–$10^{14}$ ions/$cm^3$), which neutralizes any space charge adjacent to the (heated) cathode electron-emitting and allows thermionic electron emission thereat according to the Richardson-Dushman equation $$J(\text{amp/cm}^2)=AT_c^2\exp[-e\Phi_c/k_BT_c]$$

$A$ = thermionic constant,
$\Phi_c$ = work function of cathode,
$T_c$ = cathode temperature.

With sufficiently high $T_c$ ($\gtrsim 2000°$ K.) and sufficiently low $\Phi_c$ ($\lesssim 1.6$ eV), thermionic current density can be of the order of 25 amp/$cm^2$. The electrical voltage generated between the hot cathode and the cold anode is then $V_o=\Phi_c-\Phi_a$, where $\Phi_a$ is the electron energy dissipated at the anode as heat; energy loss due to plasma resistance is apparently ignored. The apparatus generates a current with a gap voltage difference of the order of 2 volts. The invention requires use of sufficient fissionable material to produce a self-sustaining fission reaction and to produce a plasma of sufficient charge density to substantially neutralize the space charge that would otherwise develop adjacent to the charge-omitting face of the cathode.

Krieve, in U.S. Pat. No. 3,219,849 discloses a high voltage, low current output electricity generator that uses fissionable material coating for the cathode and that is arranged to minimize axial escape of fission particles and secondary emission electrons. The apparatus includes a coaxial pair of hollow metal cylinders, spaced apart and with either a high vacuum or a low pressure inert gas maintained between the two cylinders. The thin inner cylinder (cathode) is provided with a coating containing fissionable material such as $U^{235}$ or $P^{239}$. Fission in the cathode coating occurs through interaction with a stream of low energy neutrons incident upon the cathode. The outer cylinder (anode) is sufficiently thick to capture all fission fragments and gamma ray particles incident thereon and is sufficiently thin to be relatively transparent to high energy electrons, created by beta decay or Compton scattering, incident thereon; an anode wall of thickness 0.001 inch of a heavy metal such as Pt or Ni or W is recommended. High energy electrons, emitted within the anode material by beta decay or Compton scattering, are assumed to exit from the anode and to come to rest in the cathode material or other adjacent components. The positively charged fission fragments are assumed to come to rest in the anode material or other adjacent components, thus producing an electrical potential difference between cathode and anode. A coil surrounding the cathode and anode cylinders produces an axial magnetic field that tends to deflect and return charged particles emitted from the cathode to that cylinder. The inert gas particles, if any, contained between cathode and anode are ionized by collisions with the energetic fission fragments that move from the cathode toward the anode; the positively charged inert gas ions also move toward the anode, thus increasing the current in that direction. The average fission fragment is assumed to lose most or all of its kinetic energy to ionizing collisions with the inert gas particles, thus increasing the number of positively charged particles available to move to the anode. The Krieve apparatus uses an external magnetic field for charged particle control and may not be suitable for generation of high cathode-anode current, which could be limited by space charge effects.

SUMMARY OF THE INVENTION

One object of the invention is to provide method and apparatus for using neutron reactions with low atomic number elements to produce a photocurrent and an associated electric voltage.

Another object of the invention is to provide method and apparatus for using neutron reactions with low atomic number elements to produce excimers and associated low wavelength radiation.

Other objects of the invention, and advantages thereof, will become clear by reference to the detailed description and the accompanying drawings.

To achieve the foregoing objects, in accordance with the invention, the apparatus in one embodiment may comprise: a hollow, closed container with two opposing planar walls, at least one such wall having thickness $\lesssim 0.1$ mm and containing $Li^6$ and a metal with a low electron work function and constitutents; a screen anode positioned in the container interior between the two opposing planar walls; an impedance or other electrical load connecting the screen anode and at least one of the opposin planar walls that contains the $Li^6$ and the low electron work function metal as constitutents; a noble gas such as He o Ne filling the interior of the container at a pressure of 1–30 atmospheres; and a source of neutrons of energy $E \gtrsim 1$ MeV positioned outside the container adjacent to at least one of the opposing planar walls that contains the $Li^6$ and the low electron work function metal as a constituent.

The apparatus in a second embodiment may comprise: a closed, hollow sphere of radius substantially 10 M having one or more angular sectors removed and a small spherical region at the sphere center removed; the sphere wall material being electrically conducting and having an associated electron work function of no more than 1.6 eV and having wall thickness sufficient to withstand an interior pressure of at least 100 atmospheres; one or more thin metallic anode plates, positioned in the sphere interior adjacent to, substantially parallel to and spaced apart from the sphere wall, the anode plates being comprised of a material that has an electron work function that is $>>1.6$ eV; and impedance or other electrical load connecting each anode plate to the sphere wall; a noble gas such as He or Ne filling the interior of the container at a pressure of substantially 100 atmospheres; a laser fusion target positioned substantially at the geometric center of the sphere; and a source of laser radiation of predetermined frequency, located outside the sphere and positioned to irradiate the laser fusion target.

BRIEF DESCRIPTION OF THE DRAwINGS

The accompanying drawings, which are incorporated in and form part of the specification, illustrate two embodiments of the invention and, together with the detailed description, serve to explain the principles of the invention.

DETAILED DESCRIPTION OF THE PREFERRED EMBODIMENT

Figure 1:
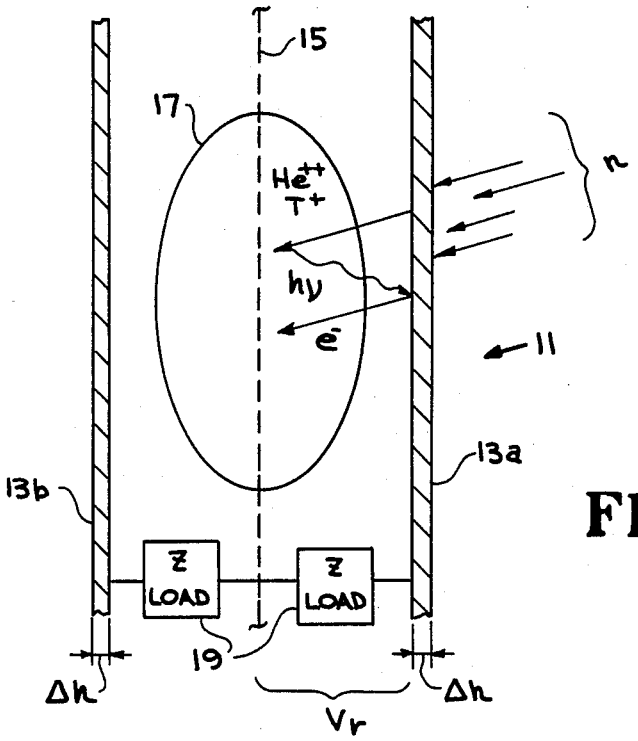
FIG. 1 is a schematic cutaway view of the apparatus of a first embodiment of the invention, illustrating use of neutron irradiation on two sides (optional).

The invention in one embodiment converts neutron energy ($E \gtrsim 1$ MeV) to electric current and the concomitant development of an electrical voltage, and it produces deep ultraviolet radiation at the same time. With reference to FIG. 1, consider a swarm of 10–14 MeV neutrons (n) incident upon one or two opposing sides of a closed hollow container 11. The container sidewall or sidewalls **13*a* and 13*b* upon which the neutrons are incident is each a thin, substantially planar metallic cathode, each of thickness h, and a substantially planar screen anode 15** is positioned parallel to, and approximately equidistance from, the two cathodes as shown. Each of the cathodes contains a low atomic weight element such as $Li^6$ as a constituent. The energetic neutrons collide with the $Li^6$ particles in the cathodes and produce ionized helium and tritium according to reactions such as $$n+Li^6 \rightarrow He^{++}+T^{+}+3e^{-}.$$

The thickness $\Delta h$ of each cathode is chosen so that the mean free path of the $He^{++}$ and the $T^{+}$ thus produced is greater than $\Delta h$. The mean free path of an alpha particle in a metal of effective atomic charge Z is estimated to be $$\lambda(He^{++}) \approx 10^{-1}/Z^2 \text{ (cm)}$$

so that the thickness of each cathode will probably be required to be $\Delta h < 0.1$ mm.

A substantial fraction (>36 percent) of the energetic $He^{++}$ and $T^{+}$ ions enter che interior of the container 11 where they encounter a high pressure gas (P=1–30 atm.) 17, such as He, Ne or Ar. The $He^{++}$ and the $T^{+}$ ions that enter the container gas deposit energy in the gas and produce additional charged particles and excited states through "Coulomb drag", and a plasma is formed. The plasma radiates deep ultraviolet photons ($h\nu$=10–20 eV), many of which strike the adjacent metal cathodes and eject photo-electrons of energy determined by $$eV = h\nu - \Phi_c,$$

$h\nu$=representative photon energy≈10–20 eV, $\Phi_c$=cathode work function≈1.6–6 eV.

The voltage V corresponding to the ejected photoelectrons is further reduced by the product, $IR_{plasma}$ of the current flow I (away from the cathode and towards the screen anode as indicated in FIG. 1) and the plasma resistance $R_{plasma}$ to a resultant voltage $$V_r = V - JR_{plasma,\ specific}$$

The plasma specific resistance value is expected to be quite low here ($R \lesssim 0.3$ ohm−cm$^2$) because of the presence of the plasma in the container gas volume. The product $JR_{plasma}$ is no more than 3 volts for $J \lesssim 10$ amps/cm$^2$, if the container space is neutralized by the plasma; and the resultant voltage developed is then $V_r$=5–15 volts. If one positions an impedance or other electric load 19 between. and connects it to, the screen anode and a metal wall cathode, an electric voltage will be developed across the load between cathode and anode. The action is analogous to that of a gas-filled photodiode, and the presence of the plasma avoids space charge limitations on current flow from cathode to anode in the container gas.

Figure 2:
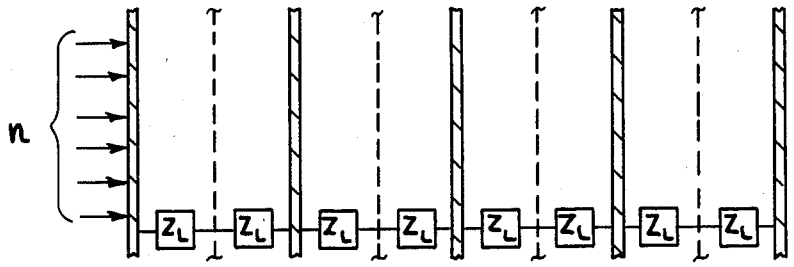
FIG. 2 is a schematic view of an embodiment involving concatenation of the first embodiment many times to produce a large overall electrical voltage.

In order to stop or substantially decelerate a neutron with initial kinetic energy E≈10 MeV, one would need an equivalent thickness of cathode-anode material of at least 25–50 cm of metallic material. Thus, one can concatenate the basic cathode/anode/gas container many times, using adjacent units as indicated in FIG. 2, and repeat the above-described sequence of events several hundred times substantially simultaneously. This improves the efficiency of conversion of the energy of the neutron swarm; and since the resulting voltages $V_r$ are additive the net resulting voltage from one end of the concatenated structure to the other can be of the order of 1 kV.

The presence of $He^{+}$ ions in the container gas volume can promote the following reactions:

$$He^{+}+2He \rightarrow He_2^{+}+He,$$

$$He_2^{+}+e^{-} \rightarrow He^{*}+He,$$

$$He^{*}+2He \rightarrow He_2^{*}+He,$$

$$He_2^{*} \xrightarrow[\text{dissoc.}]{} 2He + h\nu_d\ (\lambda_d \approx 840\ \text{Å}).$$

Figure 3:
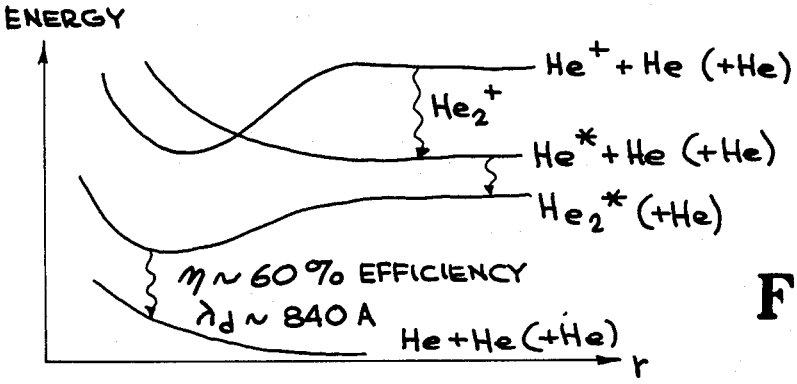
FIG. 3 is a graphic view of He-He potential energy levels in various states as a function of inter-atomic distance (r).

FIG. 3 schematically exhibits the energy levels of the excited monomers and dimers (excimers) of interest here, $He^{*}$ and $He_2^{*}$. The $He_2^{*}$ excimer will preferentially dissociate to He+He in the presence of a third particle (such as He) with emission of UV radiation at a wavelength $\lambda_d \approx 840$ Å (E=14.7 eV); this represents about 60% of the internal energy binding the two He particles. Radiation of wavelength $\lambda$=640 Å, which is also produced by the decay shown in FIG. 3, is radiation trapped and will probably not be emitted from the container. If neon or argon gas is used rather than helium gas in the container, the UV radiation would appear at a wavelength $\lambda_d \approx 1100$ Å (E=11.3 eV) or $\lambda_d \approx 1300$ Å (E=9.5 eV), respectively, with about the same conversion efficiency. Thus, with approximately 60% conversion efficiency, deep UV radiation (E=9.5–14.7 eV) can be produced and emitted from the container. Much of this radiation can be used to conduct in situ experiments within the container 11, if desired.

Figure 4:
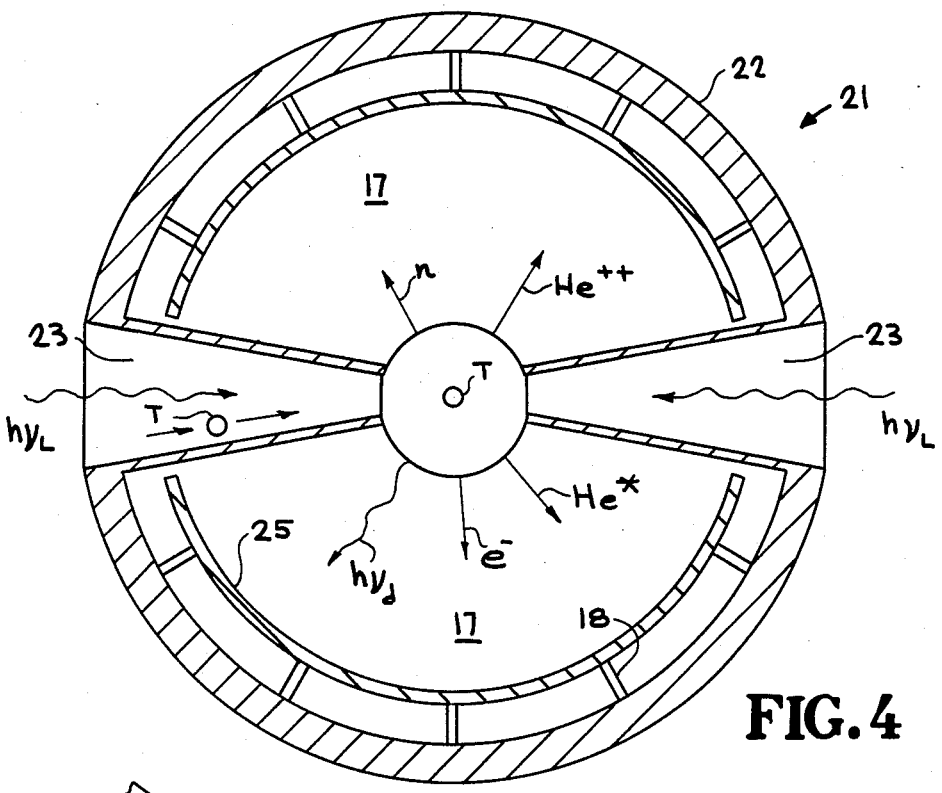
FIG. 4 is a schematic cutaway view of apparatus useful in a second embodiment of the invention.

A second embodiment of the invention also provides for generation of electricity, and the concomitant development of an electrical voltage, from fast neutron reactions. with reference to FIG. 4, a closed hollow sphere 21 is provided with a sufficiently thick shell 22 to withstand internal pressures of at least p=100 atmospheres, and the sphere interior is filled with a noble or other inert gas such as He or Ne at a pressure of substantially p=100 atm. The inner diameter of the sphere should be substantially d=20 M and should have one or more dedicated sectors 23 for delivering a sequence of fusion targets T (and, separately, two or more fusion laser beams $h\nu_L$) to the geometric center of the sphere, where laser-induced fusion occurs. Target fusion produces a plurality of high energy neutrons (n) that move through and collide with the noble gas and produce sequences of reactions such as:

$$n(fast)+He \rightarrow He^{+}(fast)+n+e^{-},$$

$$n(fast)+He \rightarrow He^{++}(fast)+n+2e^{-},$$

$$He^{++}(fast)+He \rightarrow He^{++}(fast)+He^{+}+e^{-},$$

$$He^{+}(fast)+He \rightarrow He^{+}(fast)+He^{+}+e^{-},$$

$$He^{++}(fast)+He \rightarrow He^{++}(fast)+He^{*},$$

$$He^{*}+2He \rightarrow He_2^{*}+He \rightarrow 3He+h\nu_d\ (\lambda_d \approx 840\ \text{Å}),$$

$$He^{+}+2He \rightarrow He_2^{+}+He,$$

$$He_2^{+}+e^{-} \rightarrow He_2^{*} \rightarrow 2He+h\nu_d (\lambda \approx 840\ \text{Å}).$$

With Ne substituted for He, radiation of wavelength $\lambda \approx 1100$ Å is produced from $Ne_2^{*}$ decay.

Assuming a reaction cross-section of $\sigma$(n, He)=$10^{-24}$ cm$^2$, the mean free path between collisions of an energetic neutron with He particles is $\lambda = 1N\sigma = 370$ cm so that substantially all neutron energy is absorbed in (n, He) collisions within the gas before a neutron reaches the wall of the sphere. As noted above, the He or $He^+$ or $He^{++}$ or $He_2^+$ gas particles have no electronic states that may be excited by radiation of wavelength $\lambda = 840$ Å so that the He gas is substantially transparent to such radiation. Only modest Rayleigh scattering of the radiation occurs within the gas so that most of the radiation (at photon energies up to 14.5 eV) will ultimately reach the sphere walls.

Figure 5:
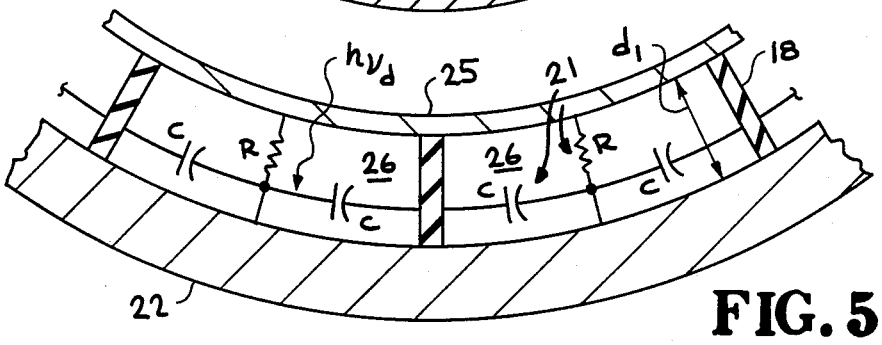
FIG. 5 is a schematic views of a cathode/anode/electrical load arrangement used for developing an electrical voltage in the second embodiment.
Figure 6:
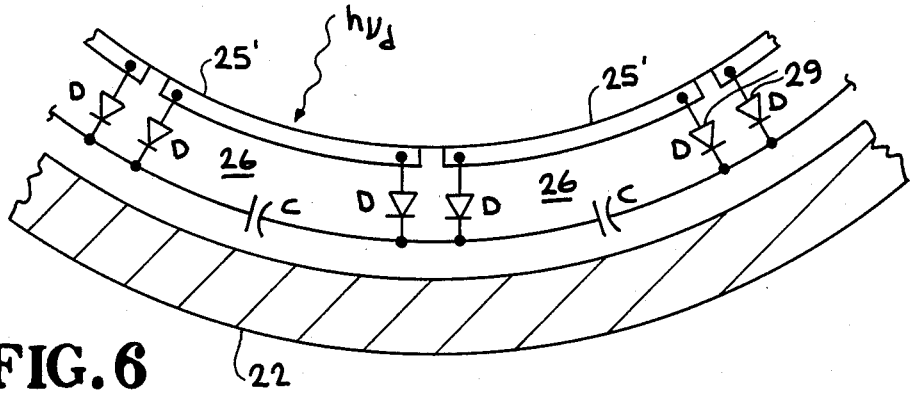
FIG. 6 is a schematic view of a photovoltaic array used for developing an electrical voltage in the second embodiment.

With reference to FIGS. 5 and 6, these photons will substantially all pass through a first layer of thin anode plates 25, positioned adjacent to and substantially parallel to the sphere walls and spaced apart therefrom in the sphere interior. The photons then strike (and mildly heat) a thick metal cathode laye 22 (the sphere wall) that is treated in bulk with Cs, Th, Ba oxide, Sr oxide or a similar suitable atomic material to reduce the work function of the metal cathode material to $\Phi_c \lesssim 1.6$ eV. Preferably, the material comprising the thin anode plates 25 has a work function $\Phi_a >> 1.6$ eV at the temperatures of operation. The photons scatter from atoms or molecules within the cathode material; and if the photon energy satisfies $$h\nu > E_F + \Phi_a,$$

where $E_F$ is the Fermi level of the electrons in the cathode material, each such photon that scatters within the cathode material may produce one or more photo-electrons that escape from the cathode material and move to one or the other of the anodes 25, thus creating a potential difference across the cathode anode circuit (FIG. 5). With the electron work function of the anode material chosen to be $>> 1.6$ eV, photo-electrons will be preferentially created in, and will preferentially exit from, the cathode material vis-a-vis the anode material so that electron flow from the sphere walls (cathode) to the anode plates will predominate.

Each anode plate 25 is positioned inside the sphere so that the space 26 between each anode plate and the adjacent sphere wall 22 is also filled with the noble gas at $p = 100$ atm pressure. The spacing $d_1$ ($= 10$–$50$ μm) by insulating soacers 18 between anode plane and sphere wall in FIG. 5 is chosen small enough so that most photo-electrons emitted by the cathode will experience only a modest number of scatterings by noble gas particles in the space separating the anode and cathode and will ultimately reach and be absorbed on one of the anode plates 25.

An approximate relation for the power produced by a target fusion event is given by $\rho = (\eta_{el} Q - 1/\eta_{laser})\, E_L\, \nu_{prf}$, $\eta_{el}$ = electrical energy conversion efficiency (assumed = 0.4 here), Q = fusion target energy gain (assumed = 80 here), $\eta_{laser}$ = laser energy efficiency (assumed = 0.05 here), $E_L$ = laser energy delivered to target (assumed = 1 MJ here), $\nu_{prf}$ = target fusion pulse repetition frequency.

If one gigawatt of power is required here, the target fusion pulse repetition rate must be at least $\nu_{prf} = 83$ Hz, which is probably achievable with current technology.

With reference to FIG. 5, the anode plates adjacent to the sphere wall can be fabricated from very thin plates of a light metal such as Al of transverse area 2–100 $cm^2$ and with adjacent anode plates being spaced apart a small distance determined by the static voltage stand-off requirements for two such adjacent plates. The anode plates themselves may be made very thin (< 100 μm thickness) as the plates are not required to maintain any pressure differential across themselves.

With reference to FIG. 6, one may replace the cathode-anode arrangement of FIG. 5 with a photovoltaic means 25' that is adjacent to but spaced apart from the sphere wall 22, with a sequence of diodes 29 electrically connecting the photovoltaic array means 25 and the sphere wall 22. The photovoltaic means 25' should preferably have a radial thickness of at least two mean free paths for absorption of the photons of characteristic energy $h\nu_d$. As a photocurrent is generated in 25' and moves through the diode (optional) or other electrical load, a substantial electrical voltage may be generated between the photovoltaic means 25 and the sphere wall 22.

Use of the photovoltaic array of FIG. 6 offers certain advantages over use of the cathode-anode array of FIG. 5. First, the photovoltaic means 25' is capable of repairing itself in the high gamma flux and high neutron flux environment by annealing higher photon flux produces a corresponding higher current, with no direct deleterious effects. Second, the current developed across the diodes is not space charged-limited, whereas the current flowing from cathode to anode in FIG. 5 may be so limited. For steady state operation, the power conversion efficiency for the photovoltaic process is approximately $\eta = F_f I_{sc} V_{oc} / P_{in}$, $F_F (\approx 0.8)$ = photovoltaic system fill factor, $I_{sc}$ = short circuit current of system, $V_{oc}$ = open circuit voltage of system ($\approx 0.85\, E_{gap}$), $P_{in}$ = power input to system, $E_{gap}$ = energy gap of suitable photovoltaic semiconductor ($\approx 1.45$–$5$ eV).

To achieve the highest conversion efficiency available (20–50 percent) for the photon energies used, one might use a semiconductor material with as high a value of $E_{gap}$ as possible (e.g., diamond or ZnS with $E_{gap} \approx 5.4$ or 3.9 eV, respectively), consistent with other physical requirements.

The foregoing description of preferred embodiments of the invention is presented for purposes of illustration only and is not intended to limit the invention to the precise form disclosed; modification and variation may be made without departing from what is regarded as the scope of the invention.

I claim:

1. Apparatus for production of an electrical voltage, the apparatus comprising:

a hollow, closed electrically conducting sphere of inner radius substantially greater than one meter, the sphere having a spherical region at the sphere center removed to allow positioning of a laser fusion target at the sphere center, and the sphere wall material having an associated electron work function of substantially 1.6 eV;

one or more thin, electrically conducting anode plates positioned in the sphere interior adjacent to and spaced apart from and substantially parallel to the adjacent sphere wall, each such plate having an associated electron work function that is $>> 1.6$ eV;

an impedance or other electrical load connecting each anode plate and the adjacent sphere wall;

an inert gas, capable of forming excimers and maintained at a pressure of substantially 100 atmospheres, contained in the interior of the hollow sphere;

a fusion target positioned substantially at the center of the sphere; and a laser beam, focused on the last fusion target.

2. Apparatus according to claim 1, wherein said inert gas is drawn from the class consisting of He and Ne.

3. Apparatus for production of an electrical voltage and of electromagnetic radiation of wavelength substantially 640 Å and higher, the apparatus comprising:

a hollow, closed container having at least one substantially planar wall containing $Li^6$ and containing electrically conducting material with an associated electron work function $\Phi_c \approx 1.6$–6 eV, with the planar wall serving as a cathode;

a screen anode, positioned in the container interior at a position spaced apart from and substantially parallel to the planar wall, the anode material containing electrically conducting material;

an impedance or other electrical load connecting the cathode and the anode;

an inert gas, capable of forming excimers and maintained at a pressure of substantially 1–30 atmospheres, filling the container interior; and a source of energetic neutrons of energy substantially 10 MeV or higher, positioned outside the container and adjacent to the planar wall.

4. Apparatus according to claim 3, wherein said hollow closed container further includes a second substantially planar wall containing $Li^6$ and a metal or other electrical conductor with an associated work function $\Phi_c \approx = 1.6$–6 eV, with the second planar wall also serving as a cathode, with the second planar wall being spaced apart from and substantially parallel to said first planar wall and said screen anode so that said screen anode is positioned between said first planar wall and the second planar wall; and further including a second impedance or other electrical load connecting said screen anode and the second cathode.

5. Apparatus according to claim 3, wherein said inert gas is drawn from a class consisting of He, Ne and Ar.

6. A method for generation of an electrical voltage and of electromagnetic radiation of wavelength substantially 640 Å or higher, the method comprising the steps of:

providing a hollow, closed container having at least one substantially planar wall that contains $Li^6$ and contains electrically conducting material with an associated electron work function of $\Phi_c \approx 1.6$–6 eV, with the planar wall being adapted to serve as a cathode;

providing a screen anode in the container interior at a position spaced apart from and substantially parallel to the planar wall, with the screen anode material being a metallic or other electrical conductor;

providing an impedance or other electrical load connecting the planar wall and the screen anode;

providing an inert gas of particles X of He, Ne or Ar, maintained at a pressure of 1–30 atmospheres, in the container interior;

directing a beam of energetic neutrons of energy substantially 10 MeV or higher at the planar wall of the container;

allowing the energetic neutrons to collide with $Li^6$ particles in the substantially planar wall to produce high energy helium ions by reactions such as $n + Li^6 \rightarrow He^{++} + He^{++} + (H^3)^+ + 3e^-$;

allowing the high energy helium ions produced by the $n + Li^6$ reactions to react with the inert gas particles X to produce ions and excimers and short wavelength radiation of wavelength $\lambda_d = c/\nu_d$ by excimer reactions such as $$X^+ + 2X \rightarrow X_2 + X,$$

$$X_2 + e^- \rightarrow X^* + X,$$

$$X^* + 2X \rightarrow X_2^* + X,$$

$$X_2^* \xrightarrow[\text{dissoc.}]{} 2X + h\nu_d;$$

allowing a portion of the dissociation radiation of wavelength $\nu_d$ to strike the adjacent planar wall and eject photoelectrons of energy substantially 10–20 eV; and allowing the photoelectrons ejected by the planar wall to move to the screen anode and create an electric potential difference between the planar wall and the screen anode.

7. A method for generation of an electrical voltage and for production of electromagnetic radiation of wavelength $\lambda_d$ that is substantially 640 Å or higher, the method comprising the steps of:

providing a hollow, closed sphere of radius substantially greater than one meter, the sphere having a region at the sphere center removed to allow positioning of a laser function target at the sphere center, the sphere material being electrically conducting and having an associated electron work function of substantially 1.6 eV and having wall thickness sufficient to withstand an interior gas pressure of substantially 100 atmospheres, with at least a portion of the sphere wall being adapted to serve as a cathode;

providing one or more electrically conducting anode plates that are optionally thin to electromagnetic radiation at the wavelength $\lambda_d$, positioned in the sphere interior adjacent to and spaced apart from and substantially parallel to the adjacent sphere wall, each anode plate having an associated electron work function $\Phi_a << 1.6$ eV;

providing an impedance or other electrical load connecting the anode plate and the adjacent sphere wall;

providing an inert gas of particles X of He or Ne in the sphere interior at a pressure of substantially 100 atmospheres;

providing a laser fusion target substantially at the sphere center;

irradiating the fusion target to produce a plurality of high energy neutrons of energy substantially 10 MeV or higher;

allowing the high energy neutrons to move through and collide with the inert gas particles X to produce ions and excimers and electromagnetic radiation of wavelength substantially $\lambda = \lambda_d = c/\nu_d$, where c is the velocity of light, by reactions such as $$n(\text{fast}) + X \rightarrow n(\text{fast}) + X^+(\text{fast}) + e^-,$$

$$n(\text{fast}) + X \rightarrow n(\text{fast}) + X^{++}(\text{fast}) + 2e^-,$$

$$X^{++(fast)}+X \rightarrow X^{++(fast)}+X^{+}+e^{-},$$

$$X^{+}(fast)+X \rightarrow X^{+(fast)}+X^{+}+e^{-},$$

$$X^{++}(fast)+X \rightarrow X^{++(fast)}+X^{*},$$

$$X^{\circ}+2X \rightarrow X_2^{\circ}+X \rightarrow 3X+h\nu_d,$$

$$X^{+}+2X \rightarrow X_2^{+}+X,$$

$$X_2^{+}+e^{-} \rightarrow X_2^{\circ} \rightarrow 2X+h\nu_d;$$

allowing the electromagnetic radiation thus produced to pass through one or more of the anode plates and strike the sphere wall to produce a plurality of photoelectrons; and allowing the photoelectrons to move from the sphere wall to the anode plate, thus producing an electrical potential difference between cathode and anode plates.

* * * * *